US006990531B2

(12) United States Patent　　(10) Patent No.: US 6,990,531 B2
Vange　　(45) Date of Patent: Jan. 24, 2006

(54) SYSTEM AND METHOD FOR PROVIDING LAST-MILE DATA PRIORITIZATION

(75) Inventor: Mark Vange, Toronto (CA)

(73) Assignee: Circadence Corporation, Boulder, CO (US)

( * ) Notice: Subject to any disclaimer, the term of this patent is extended or adjusted under 35 U.S.C. 154(b) by 679 days.

(21) Appl. No.: 09/835,871

(22) Filed: Apr. 16, 2001

(65) Prior Publication Data

US 2002/0002618 A1　　Jan. 3, 2002

Related U.S. Application Data

(60) Provisional application No. 60/197,490, filed on Apr. 17, 2000.

(51) Int. Cl.
　　*G06F 15/173*　　(2006.01)
(52) U.S. Cl. .................. 709/240; 709/217; 709/218; 709/219; 709/228; 709/229; 709/231; 709/232; 709/235; 709/238; 370/230; 370/231; 370/232; 370/354
(58) Field of Classification Search ........ 709/200–253; 370/230–232, 354
See application file for complete search history.

(56) References Cited

U.S. PATENT DOCUMENTS

| | | | |
|---|---|---|---|
| 5,258,983 A | | 11/1993 | Lane et al. |
| 5,455,826 A | * | 10/1995 | Ozveren et al. ............ 370/232 |
| 5,673,322 A | | 9/1997 | Pepe et al. |
| 5,757,771 A | | 5/1998 | Li et al. |
| 5,805,203 A | * | 9/1998 | Horton ....................... 725/119 |
| 5,933,412 A | | 8/1999 | Choudhury et al. |
| 5,951,694 A | | 9/1999 | Choquier et al. |
| 5,999,971 A | | 12/1999 | Buckland |
| 6,006,264 A | | 12/1999 | Colby et al. |
| 6,014,694 A | * | 1/2000 | Aharoni et al. ............. 709/219 |
| 6,023,456 A | | 2/2000 | Chapman et al. |
| 6,034,964 A | | 3/2000 | Fukushima et al. |
| 6,167,449 A | | 12/2000 | Arnold et al. |
| 6,185,520 B1 | * | 2/2001 | Brown et al. .................. 703/25 |
| 6,205,119 B1 | * | 3/2001 | Kaczynski ................... 370/231 |
| 6,233,224 B1 | * | 5/2001 | Yamashita et al. .......... 370/231 |
| 6,240,066 B1 | * | 5/2001 | Nagarajan et al. .......... 370/230 |
| 6,286,052 B1 | * | 9/2001 | McCloghrie et al. ....... 709/238 |
| 6,529,499 B1 | * | 3/2003 | Doshi et al. ................. 370/352 |
| 6,597,689 B1 | * | 7/2003 | Chiu et al. .................... 370/354 |
| 6,628,615 B1 | * | 9/2003 | Joseph et al. ............... 370/231 |

FOREIGN PATENT DOCUMENTS

EP　　　　0384339 A2　　8/1990

(Continued)

OTHER PUBLICATIONS

K. Sriram, "Methodologies for bandwidth allocation, transmission scheduling, and congestion avoidance in broadband ATM networks", Computer Networks and ISDN Systems, 26 (1993) pp. 43-59.

(Continued)

*Primary Examiner*—Nabil El-Hady
(74) *Attorney, Agent, or Firm*—Stuart T. Langley; Hogan & Hartson L.L.P.; Kent A. Lembke (57) ABSTRACT

Systems and methods for prioritizing data traffic over a shared bandwidth connection. In one embodiment, traffic is prioritized implicitly by governing the rate at which data is launched into the shared bandwidth connection. In another embodiment, mechanisms that couple the Internet to the shared bandwidth connection are explicitly regulated through a control interface. Priority information is coupled through the Internet to front-end computers. The front-end computers couple to the shared bandwidth connection and implement the implicit and/or explicit regulation.

22 Claims, 4 Drawing Sheets

FOREIGN PATENT DOCUMENTS

| | | |
|---|---|---|
| EP | 0794491 A2 | 9/1997 |
| EP | 0828214 A2 | 3/1998 |
| EP | 0942363 A2 | 9/1999 |
| GB | 2309558 | 7/1997 |
| WO | WO 97/29424 | 8/1997 |
| WO | WO 97/30392 | 8/1997 |
| WO | WO 98/26553 | 6/1998 |
| WO | WO 98/28938 | 7/1998 |
| WO | WO 99/09689 | 2/1999 |
| WO | WO 99/18534 | 4/1999 |
| WO | WO 99/57620 | 11/1999 |
| WO | WO 99/57637 | 11/1999 |

OTHER PUBLICATIONS

V. P. Kumar, et al., "Beyond Best Effort: Router Architectures for the Differentiated Services of Tomorrow's Internet", May 1998, IEEE Communications Magazine, pp. 152-164.

R. M. Adler, "Distributed Coordination Models for Client/Server Computing", Apr. 1995, IEEE Computer, pp. 14-22.

G.-C. Lai, et al., "Support QoS in IP over ATM", Computer Communications, 22 (1999) pp. 411-418.

* cited by examiner

SYSTEM AND METHOD FOR PROVIDING LAST-MILE DATA PRIORITIZATION

RELATED APPLICATIONS

The present invention claims priority from U.S. Provisional Patent Application No. 60/197,490 entitled CONDUCTOR GATEWAY filed on Apr. 17, 2000.

BACKGROUND OF THE INVENTION

1. Field of the Invention

The present invention relates, in general, to network information access and, more particularly, to software, systems and methods for serving web pages in a coordinated fashion from multiple cooperating web servers.

2. Relevant Background

Increasingly, business data processing systems, entertainment systems, and personal communications systems are implemented by computers across networks that are interconnected by internetworks (e.g., the Internet). The Internet is rapidly emerging as the preferred system for distributing and exchanging data. Data exchanges support applications including electronic commerce (e-commerce), broadcast and multicast messaging, videoconferencing, gaming, and the like.

The Internet is a collection of disparate computers and networks coupled together by a web of interconnections using standardized communications protocols. The Internet is characterized by its vast reach as a result of its wide and increasing availability and easy access protocols. Unfortunately, the ubiquitous nature of the Internet results in variable bandwidth and quality of service between points. The latency and reliability of data transport is largely determined by the total amount of traffic on the Internet and so varies wildly seasonally and throughout the day. Other factors that affect quality of service include equipment outages and line degradation that force packets to be rerouted, damaged and/or dropped. Also, routing software and hardware limitations within the Internet infrastructure may create bandwidth bottlenecks even when the mechanisms are operating within specifications.

Users connect to the Internet through a variety of mechanisms, but many mechanisms use shared bandwidth connections. For example, data connections using broadband wireless access (BWA), cellular telephones and cable modems typically share a given amount of bandwidth amongst a plurality of users. Each user's data is transported on a first-in first-out (FIFO) basis. In such a transport medium, there is no mechanism for prioritizing some data over other data, or some users over other users. Prioritization has not been an issue in many applications because the average latency of such networks has been sufficiently low and sufficiently uniform to provide acceptable performance. However, there is an increasing demand for network applications and data access that cannot tolerate high and variable latency.

In e-commerce applications, it is important to provide a satisfying user experience that leads to a purchase transaction. To provide this high level of service, a web site operator must ensure that data is delivered to the customer in the most usable, efficient, and timely fashion. Also, the web site operator must ensure that critical data received from the customer is handled with priority. Until now, however, the e-commerce site owner has had little or no control over the transport mechanisms from the Internet to a user device that affect the latency and quality of service.

While efforts are continually being made to increase the capacity and quality of service afforded by the Internet, it is contemplated that congestion will always impact the ability to predictably and reliably offer a specified level of service. This is particularly true in wireless and other shared bandwidth transport media that historically oversubscribe the available bandwidth. Moreover, the change in the demand for bandwidth increases at a greater rate than does the change in bandwidth supply, ensuring that congestion will continue to be an issue into the foreseeable future. A need exists for a system to exchange data that provides a high quality of service even during periods of congestion.

The communication mechanisms linking a user to the Internet are often referred to as the "last-mile". Because the last-mile connectivity must fan out to reach a large number of users, there is great emphasis on shared bandwidth mechanisms that enable any infrastructure investment to be leveraged over many users. The last-mile provider (e.g., a broadband wireless access provider, cable company, or cellular telephone company) provides routers that couple to the Internet, and wireless transceivers that couple between the routers and users to implement the shared bandwidth medium.

In general, once data communication leaves the confines of the Internet into a shared bandwidth medium, web sites and infrastructure entities that attempt to provide prioritization loose the ability regulate and control the flow of data communication over the last-mile. While the last-mile provider may attempt to provide bandwidth management within their network, there currently is no mechanism for an Internet entity, such as a web site, to readily manipulate the shared bandwidth medium.

SUMMARY OF THE INVENTION

Briefly stated, the present invention involves systems and methods for prioritizing data traffic over a shared bandwidth connection. In one embodiment, traffic is prioritized implicitly by governing the rate at which data is launched into the shared bandwidth connection. In another embodiment, mechanisms that couple the Internet to the shared bandwidth connection are explicitly regulated through a control interface. Priority information is coupled through the Internet to front-end computers. The front-end computers couple to the shared bandwidth connection and implement the implicit and/or explicit regulation.

DETAILED DESCRIPTION OF THE PREFERRED EMBODIMENTS

The present invention is directed to systems and methods for prioritizing data traffic as it is communicated between a network such as the Internet, and an end user's client computer. This communication link is often referred to as the "last-mile" in network architecture descriptions. The last-mile link is typically implemented using different communication technology than is used in the Internet itself. For example, modem connections to a modem pool maintained by an Internet service provider (ISP) were prevalent for many years. More recently, last-mile links are being implemented using broadband communication technologies such as digital subscriber line (DSL), broadband wireless, cable modems, as well as digital cellular communication.

These technologies characteristically share available bandwidth amongst a plurality of end-user machines in a manner controlled by the last-mile provider (e.g., the ISP, cellular system operator, cable company and the like). The present invention is directed to systems and methods enabling entities outside of the last-mile provider's system to have some level of control over the effective allocation of bandwidth within the last-mile system. In some embodiments, the effective bandwidth allocation is achieved without any presence within the last-mile communication system itself.

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary, the present invention is applicable to significantly larger, more complex network environments, including wireless network environments, as well as small network environments such as conventional and wireless LAN systems.

In accordance with the disclosed embodiments of the present invention, prioritization performed by a front-end server located at the edge of the network. The front-end server is coupled to communicate data, typically in the form of IP packets, with an interface to the last-mile communication system, although any communication protocol supported by the last-mile interface can be adopted by the front-end server. The front-end server implements a mechanism for discriminating between request and/or response packets communicated with the last-mile communication system. In the case of outgoing traffic (i.e., originating from the last-mile interface), the front-end preferably buffers and/or reorders requests before transmitting them over the Internet. In the case of incoming traffic (i.e., originating from the Internet), the front-end server implements a mechanism for buffering and/or reordering response packets before they are transmitted over the last-mile interface.

The front-end server either explicitly or implicitly controls the mix of data flowing through the interface to the last-mile communication system. In one embodiment, the front-end is coupled to supply data to the last-mile interface, and can therefore implicitly prioritize data by regulating the order and rate at which data is supplied to the interface. In another embodiment, the front-end establishes policy for a router that feeds data to the last-mile interface. This enables the front-end to specifically manipulate the order and rate at which packets pass through the router and are applied to the last-mile interface.

A particular last-mile communication system may be statically associated with a front-end server so that all communication entering and leaving the last-mile interface goes through the associated front-end server. Alternatively, a redirection mechanism is enabled to select from a pool of available front-end servers and client request-response traffic is conducted through the selected front-end server.

The front-end server 201 handles communication with originating servers or other network servers that contain the information and resources that are the subject of each request. In some embodiments, it is useful for the front-end server 201 to indicate priority information associated with particular data so that these other network servers may use the priority information. For example, resource reservation protocol (RSVP) and integrated services described in IETF document RFC 1633 are mechanisms that provide various levels of service based upon an indicated priority. This enables the client 205 to benefit from prioritization functionality implemented elsewhere in the data network without necessarily requiring modification to the client 205.

Preferably, the front-end server establishes and maintains an enhanced communication channel with the originating web servers or other network resources. By enhanced, it is meant that the channel offers improved quality of service, lower latency, prioritization services, higher security transport, or other features and services that improve upon the basic transport mechanisms (such as TCP) defined for Internet data transport. In this manner, prioritization functionality can be provided both in the Internet, and in the last-mile connection to the Internet.

For purposes of this document, a web server is a computer running server software coupled to the World Wide Web (i.e., "the web") that delivers or serves web pages. The web server has a unique IP address and accepts connections in order to service requests by sending back responses. A web server differs from a proxy server or a gateway server in that a web server has resident a set of resources (i.e., software programs, data storage capacity, and/or hardware) that enable it to execute programs to provide an extensible range of functionality such as generating web pages, accessing remote network resources, analyzing contents of packets, reformatting request/response traffic and the like using the resident resources. In contrast, a proxy simply forwards request/response traffic on behalf of a client to resources that reside elsewhere, or obtains resources from a local cache if implemented. A web server in accordance with the present invention may reference external resources of the same or different type as the services requested by a user, and reformat and augment what is provided by the external resources in its response to the user. Commercially available web server software includes Microsoft Internet Information Server (IIS), Netscape Netsite, Apache, among others. Alternatively, a web site may be implemented with custom or semi-custom software that supports HTTP traffic.

Figure 1:
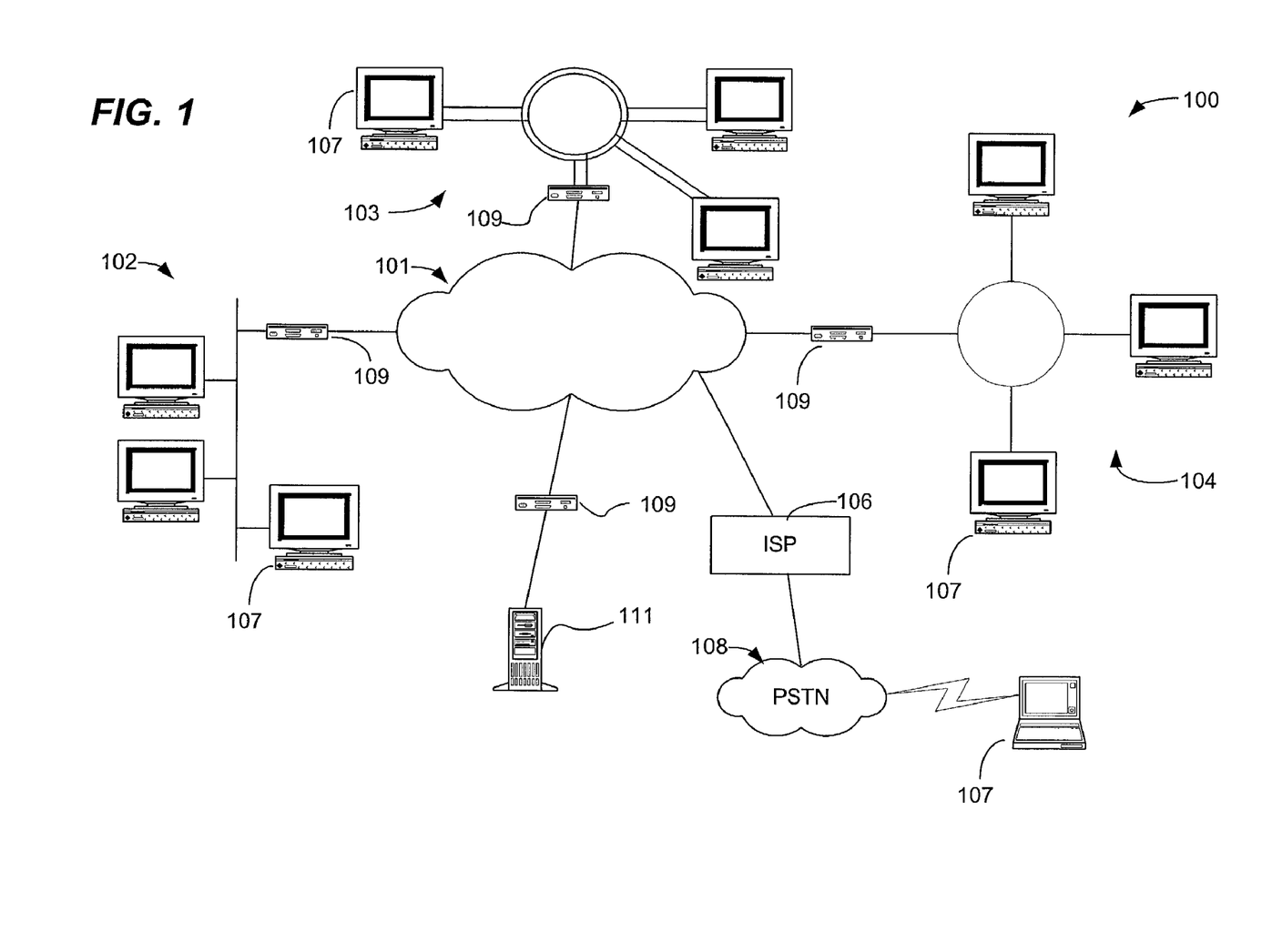
FIG. 1 illustrates a general distributed computing environment in which the present invention is implemented.

FIG. 1 shows an exemplary computing environment 100 in which the present invention may be implemented. Environment 100 includes a plurality of local networks such as Ethernet network 102, FDDI network 103 and Token Ring network 104. Essentially, a number of computing devices and groups of devices are interconnected through a network 101. For example, local networks 102, 103 and 104 are each coupled to network 101 through routers 109. LANs 102, 103 and 104 may be implemented using any available topology and may implement one or more server technologies including, for example UNIX, Novell, or Windows NT networks, or peer-to-peer type network. Each network will include distributed storage implemented in each device and typically includes some mass storage device coupled to or managed by a server computer. Network 101 comprises, for example, a public network such as the Internet or another network mechanism such as a fibre channel fabric or conventional WAN technologies.

Local networks 102, 103 and 104 include one or more network appliances 107. One or more network appliances 107 may be configured as an application and/or file server. Each local network 102, 103 and 104 may include a number of shared devices (not shown) such as printers, file servers, mass storage and the like. Similarly, devices 111 may be shared through network 101 to provide application and file services, directory services, printing, storage, and the like. Routers 109 provide a physical connection between the various devices through network 101. Routers 109 may implement desired access and security protocols to manage access through network 101. Network appliances 107 may also couple to network 101 through public switched telephone network 108 using copper or wireless connection technology. In a typical environment, an Internet service provider 106 supports a connection to network 101 as well as PSTN 108 connections to network appliances 107.

Network appliances 107 may be implemented as any kind of network appliance having sufficient computational function to execute software needed to establish and use a connection to network 101. Network appliances 107 may comprise workstation and personal computer hardware executing commercial operating systems such as Unix variants, Microsoft Windows, Macintosh OS, and the like. At the same time, some appliances 107 comprise portable or handheld devices using wireless connections through a wireless access provider such as personal digital assistants and cell phones executing operating system software such as PalmOS, WindowsCE, EPOCOS, and the like. Moreover, the present invention is readily extended to network devices such as office equipment, vehicles, and personal communicators that make occasional connection through network 101.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm (not shown) that provides mass storage capacity beyond what an individual device can efficiently use and manage. Selected components of the present invention may be stored in or implemented in shared mass storage.

Figure 2:
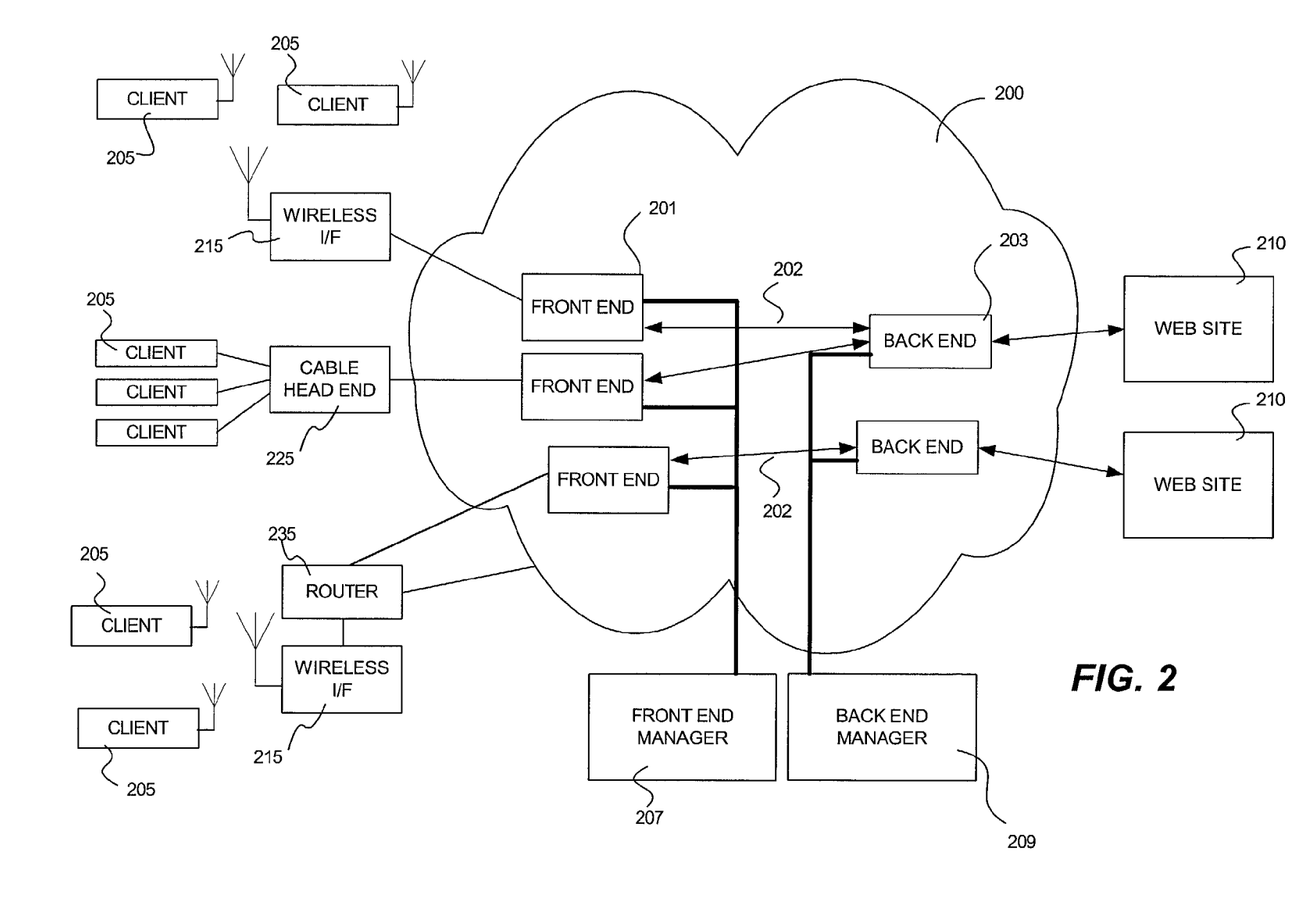
FIG. 2 shows in block-diagram form significant components of a system in accordance with the present invention.

FIG. 2 illustrates a private network 200 implemented within the Internet infrastructure. Private network 200 expedites and prioritizes communications between a client 205 and a web site 210. In the specific examples herein clients 205 comprises client software that can access a standard or proprietary user level protocol for network access. Examples include client applications for file transfer protocol (FTP) services, voice over Internet protocol (VOIP) services, network news protocol (NNTP) services, multi-purpose internet mail extensions (MIME) services, post office protocol (POP) services, simple mail transfer protocol (SMTP) services, as well as Telnet services. In addition to network protocols, the client application may access a network application such as a database management system (DBMS) in which case the client application generates query language (e.g., structured query language or "SQL") messages. In wireless appliances, a client application may communicate via a wireless application protocol (WAP), extensible markup language (XML) or the like.

For convenience, the term "web site" is used interchangeably with "web server" in the description herein although it should be understood that a web site comprises a collection of content, programs and processes implemented on one or more web servers. A web site is owned by the content provider such as an e-commerce vendor whereas a web server refers to set of programs running on one or more machines coupled to an Internet node. The web site 210 may be hosted on the site owner's own web server, or hosted on a web server owned by a third party. A web hosting center is an entity that implements one or more web sites on one or more web servers using shared hardware and software resources across the multiple web sites. In a typical web infrastructure, there are many web browsers, each of which has a TCP connection to the web server in which a particular web site is implemented. The present invention adds two components to the infrastructure: a front-end 201 and back-end 203. Front-end 201 and back-end 203 are coupled by a managed data communication link 202 that forms, in essence, a private network.

Front-end mechanisms 201 serve as an access point for client-side communications through various shared bandwidth last-mile connections. In one example, a front-end 201 couples directly to a wireless network interface 215. In another example, a front-end 201 couples directly to a cable head end unit 225 that feeds multiple clients 205 operating cable set-top boxes (not shown). In another embodiment, front-end 201 couples to a router 235 that communicates with a wireless network interface 215. In each case, front-end 201 is able to regulate the rate and/or order at which data is applied to the shared bandwidth network.

Front-ends 201 include mechanisms for discriminating between data in order to implement effective prioritization. The mechanisms can take a variety of forms, however. In one preferred implementation, response data packets arriving at the front-end 201 from the Internet are associated with a prioritization value supplied by, for example, the web site owner. The enhanced channel 202 is important in this implementation to provide a ready mechanism to communicate this prioritization value to the front-end 201. In another embodiment, front-end 201 determines a priority value based on a user identification and/or content type and/or other criteria that it can determine from a request packet received from the last-mile connection. When a corresponding response packet is received, the determined priority value is used to order the response packet relative to other users' response packets before they are applied to the last-mile connection (e.g., interface 215, head end 225 or router 235).

Transport mechanism 202 is implemented by cooperative actions of the front-end 201 and back-end 203. Back-end 203 processes and directs data communication to and from web site 210. Transport mechanism 202 communicates data packets using a proprietary protocol over the public Internet infrastructure in the particular example. Hence, the present invention does not require heavy infrastructure investments and automatically benefits from improvements implemented in the general purpose network 101. Unlike the general purpose Internet, front-end 201 and back-end 203 are programmably assigned to serve accesses to a particular web site 210 at any given time.

It is contemplated that any number of front-end and back-end mechanisms may be implemented cooperatively to support the desired level of service required by the web site owner. The present invention implements a many-to-many mapping of front-ends to back-ends. Because the front-end to back-end mappings can by dynamically changed, a fixed hardware infrastructure can be logically reconfigured to map more or fewer front-ends to more or fewer back-ends and web sites or servers as needed.

Front-end 201 together with back-end 203 function to reduce traffic across the TMP link 202 and to improve response time for selected browsers. Traffic across the TMP link 202 is reduced by compressing data and serving browser requests from cache for fast retrieval. Also, the blending of request datagrams results in fewer request:acknowledge pairs across the TMP link 202 as compared to the number required to send the packets individually between front-end 201 and back-end 203. This action reduces the overhead associated with transporting a given amount of data, although conventional request:acknowledge traffic is still performed on the links coupling the front-end 201 to client 205 and back-end 203 to a web server. Moreover, resend traffic is significantly reduced further reducing the traffic. Response time is further improved for select privileged users and for specially marked resources by determining the priority for each HTTP transmission.

In one embodiment, front-end 201 and back-end 203 are closely coupled to the Internet backbone. This means they have high bandwidth connections, can expect fewer hops, and have more predictable packet transit time than could be expected from a general-purpose connection. Although it is preferable to have low latency connections between front-ends 201 and back-ends 203, a particular strength of the present invention is its ability to deal with latency by enabling efficient transport and traffic prioritization. Hence, in other embodiments front-end 201 and/or back-end 203 may be located farther from the Internet backbone and closer to clients 205 and/or web servers 210. Such an implementation reduces the number of hops required to reach a front-end 201 while increasing the number of hops within the TMP link 202 thereby yielding control over more of the transport path to the management mechanisms of the present invention.

Hence, clients 205 do not conduct all data transactions directly with a web server 210. Instead, clients 205 conduct some and preferably a majority of transactions with front-ends 201. Client data is then sent, using TMP link 202, to the back-end 203 and then to the web server 210. Running multiple clients 205 over one large connection provides several advantages:

Since all client data is mixed, each client can be assigned a priority. Higher priority clients, or clients requesting higher priority data, can be given preferential access to network resources so they receive access to the channel sooner while ensuring low-priority clients receive sufficient service to meet their needs.

The large connection between a front-end 201 and back-end 203 can be permanently maintained, shortening the many TCP/IP connection sequences normally required for many clients connecting and disconnecting.

Using a proprietary protocol allows the use of more effective techniques to improve data throughput and makes better use of existing bandwidth during periods when the network is congested.

A particular advantage of the architecture shown in FIG. 2 is that it is readily scaled. Any number of client machines 205 may be supported. In a similar manner, a web site owner may choose to implement a site using multiple web servers 210 that are co-located or distributed throughout network 101. To avoid congestion, additional front-ends 201 may be implemented or assigned to particular web sites. Each front-end 201 is dynamically re-configurable by updating address parameters to serve particular web sites. Client traffic is dynamically directed to available front-ends 201 to provide load balancing. Hence, when quality of service drops because of a large number of client accesses, an additional front-end 201 can be assigned to the web site and subsequent client requests directed to the newly assigned front-end 201 to distribute traffic across a broader base.

In the particular examples, this is implemented by a front-end manager component 207 that communicates with multiple front-ends 201 to provide administrative and configuration information to front-ends 201. Each front-end 201 includes data structures for storing the configuration information, including information identifying the IP addresses of web servers 210 to which they are currently assigned. Other administrative and configuration information stored in front-end 201 may include information for prioritizing data from and to particular clients, quality of service information, and the like.

Similarly, additional back-ends 203 can be assigned to a web site to handle increased traffic. Back-end manager component 209 couples to one or more back-ends 203 to provide centralized administration and configuration service. Back-ends 203 include data structures to hold current configuration state, quality of service information and the like. In the particular examples front-end manager 207 and back-end manager 209 serve multiple web sites 210 and so are able to manipulate the number of front-ends and back-ends assigned to each web site 210 by updating this configuration information. When the congestion for the site subsides, the front-end 201 and back-end 203 can be reassigned to other, busier web sites. These and similar modifications are equivalent to the specific examples illustrated herein.

In the case of web-based environments, front-end 201 is implemented using custom or off-the-shelf web server software. Front-end 201 is readily extended to support other, non-web-based protocols, however, and may support multiple protocols for varieties of client traffic. Front-end 201 processes the data traffic it receives, regardless of the protocol of that traffic, to a form suitable for transport by TMP 202 to a back-end 203. Hence, most of the functionality implemented by front-end 201 is independent of the protocol or format of the data received from a client 205. Although the discussion of the exemplary embodiments herein relates primarily to front-end 201 implemented as a web server, it should be noted that, unless specified to the contrary, web-based traffic management and protocols are merely examples and not a limitation of the present invention.

Figure 3:
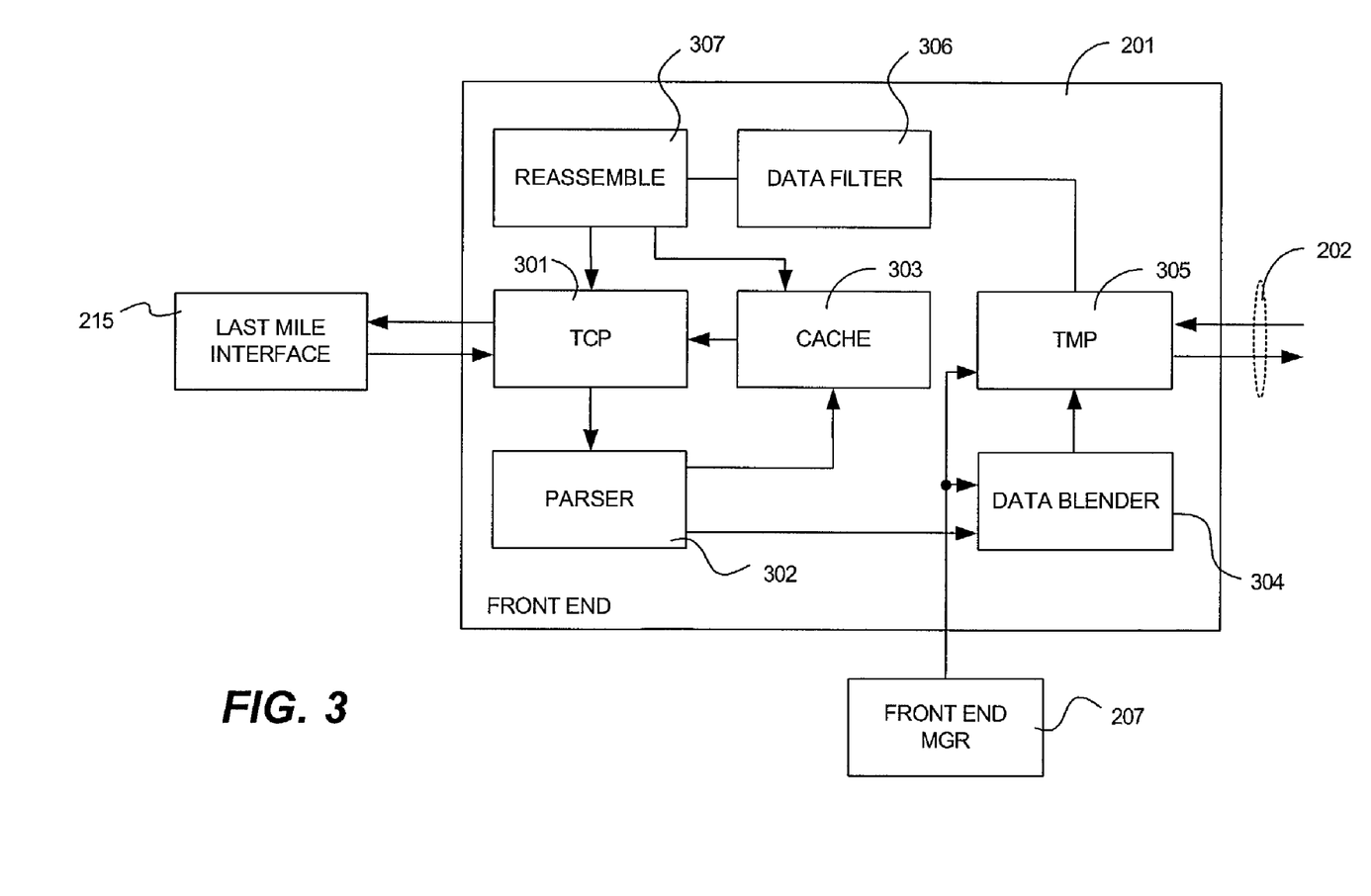
FIG. 3 shows front-end components of FIG. 2 in greater detail.

FIG. 3 illustrates principle functional components of an exemplary front-end 201 in greater detail. Primary functions of the front-end 201 include creating and maintaining a TCP socket for each active client communication channel and prioritizing the order and rate at which data is transmitted on those sockets relative to each other. In the preferred implementations, front-end 201 also translates transmission control protocol (TCP) packets from last-mile interface 215/225/235 into transport morphing protocol™ (TMP™) packets used in the system in accordance with the preferred embodiments. Transport morphing protocol and TMP are trademarks or registered trademarks of Circadence Corporation in the United States and other countries. It is contemplated that the various functions described in reference to the specific examples may be implemented using a variety of data structures and programs operating at any location in a distributed network. For example, a front-end 201 may be operated on a network appliance 107 or server within a particular network 102, 103, or 104 shown in FIG. 1. The present invention is readily adapted to any application where multiple clients are coupling to a centralized resource. Moreover, other transport protocols may be used, including proprietary transport protocols.

TCP component 301 includes devices for implementing physical connection layer and Internet protocol (IP) layer functionality. Current IP standards are described in IETF documents RFC0791, RFC0950, RFC0919, RFC0922, RFC792, RFC1112 that are incorporated by reference herein. For ease of description and understanding, these mechanisms are not described in great detail herein. Where protocols other than TCP/IP are used to couple to a client 205, TCP component 401 is replaced or augmented with an appropriate network protocol process.

TCP component 301 communicates TCP packets with one or more clients 205 through last-mile interface 215/225/235 as appropriate. Received packets are coupled to parser 302 where the Internet protocol (or equivalent) information is extracted. TCP is described in IETF RFC0793 which is incorporated herein by reference. Each TCP packet includes header information that indicates addressing and control variables, and a payload portion that holds the user-level data being transported by the TCP packet. The user-level data in the payload portion typically comprises a user-level network protocol datagram.

Parser 302 analyzes the payload portion of the TCP packet. In the examples herein, HTTP is employed as the user-level protocol because of its widespread use and the advantage that currently available browser software is able to readily use the HTTP protocol. Particularly in the case of wireless devices, however, other protocols may be used more commonly such as handheld device markup language (HDML), wireless access protocol (WAP) and extensible markup language (XML) protocols. Parser 302 may implement file transfer protocol (FTP), mail protocols such as simple mail transport protocol (SMTP), structured query language (SQL) and the like. Essentially, parser 302 comprises a parser that can look into the received packet to identify information from the payload portion of the packet, regardless of the particular user-level protocol in use. Any user-level protocol, including proprietary protocols, may be implemented within the present invention using appropriate modification of parser 302.

To improve performance, front-end 201 optionally includes a caching mechanism 303. Cache 303 may be implemented as a passive cache that stores frequently and/or recently accessed web pages or as an active cache that stores network resources that are anticipated to be accessed. In non-web applications, cache 303 may be used to store any form of data representing database contents, files, program code, and other information. Upon receipt of a TCP packet, HTTP parser 302 determines if the packet is making a request for data within cache 303. If the request can be satisfied from cache 303, the data is supplied directly without reference to web server 210 (i.e., a cache hit). Cache 303 implements any of a range of management functions for maintaining fresh content. For example, cache 303 may invalidate portions of the cached content after an expiration period specified with the cached data or by web sever 210. Also, cache 303 may proactively update the cache contents even before a request is received for particularly important or frequently used data from web server 210. Cache 303 evicts information using any desired algorithm such as least recently used, least frequently used, first in/first out, or random eviction. When the requested data is not within cache 303, a request is processed to web server 210, and the returned data may be stored in cache 303.

Several types of packets will cause parser 304 to forward a request towards web server 210. For example, a request for data that is not within cache 303 (or if optional cache 303 is not implemented) will require a reference to web server 210. Some packets will comprise data that must be supplied to web server 210 (e.g., customer credit information, form data and the like). In these instances, HTTP parser 302 couples to data blender 304.

Optionally, front-end 201 implements security processes, compression processes, encryption processes and the like to condition the received data for improved transport performance and/or provide additional functionality. These processes may be implemented within any of the functional components (e.g., data blender 304) or implemented as separate functional components within front-end 201.

Also, front-end 201 may implement prioritization logic (shown in FIG. 4) to identify packets that should be given higher priority service. A prioritization program requires only that front-end 201 include a data structure associating particular clients 205 or particular TCP packet types or contents with a prioritization value. Although the prioritization value is used primarily for determining the rate and order that response packets are sent to the last-mile communication system, the prioritization value may be put to other uses for both request and response traffic. Based on the prioritization value, front-end 201 may selectively implement such features as caching, encryption, security, compression and the like to provide differential performance and/or functionality. The prioritization value is provided by the owners of web site 210, for example, and may be dynamically altered, statically set, or updated from time to time to meet the needs of a particular application.

Blender 304 slices and/or coalesces the data portions of the received packets into a more desirable "TMP units" that are sized for transport through the TMP mechanism 202. The data portion of TCP packets may range in size depending on client 205 and any intervening links coupling client 205 to TCP component 301. Moreover, where compression is applied, the compressed data will vary in size depending on the compressibility of the data. Data blender 304 receives information from front-end manager 207 that enables selection of a preferable TMP packet size. Alternatively, a fixed TMP packet size can be set that yields desirable performance across TMP mechanism 202. Data blender 304 also marks the TMP units so that they can be re-assembled at the receiving end.

In the preferred implementation, data blender 304 also serves as a buffer for storing packets from all clients 205 that are associated with front-end 201. Blender 304 mixes data packets coming into front-end 201 into a cohesive stream of TMP packets sent to a back-end 203 over TMP link 202. In creating a TMP packet, blender 304 is able to pick and choose amongst the available data packets so as to prioritize some data packets over others.

Also shown in FIG. 3 are data filter component 306 and HTTP reassemble component 307 that process incoming (with respect to client 205) data. TMP mechanism 305 receives TMP packets from TMP pipe 202 and extracts the TMP data units. Using the appended sequencing information, the extracted data units are reassembled into HTTP data packet information by HTTP reassembler 307. Data filter component 306 may also implement data decompression where appropriate, decryption, and handle caching when the returning data is of a cacheable type.

Figure 4:
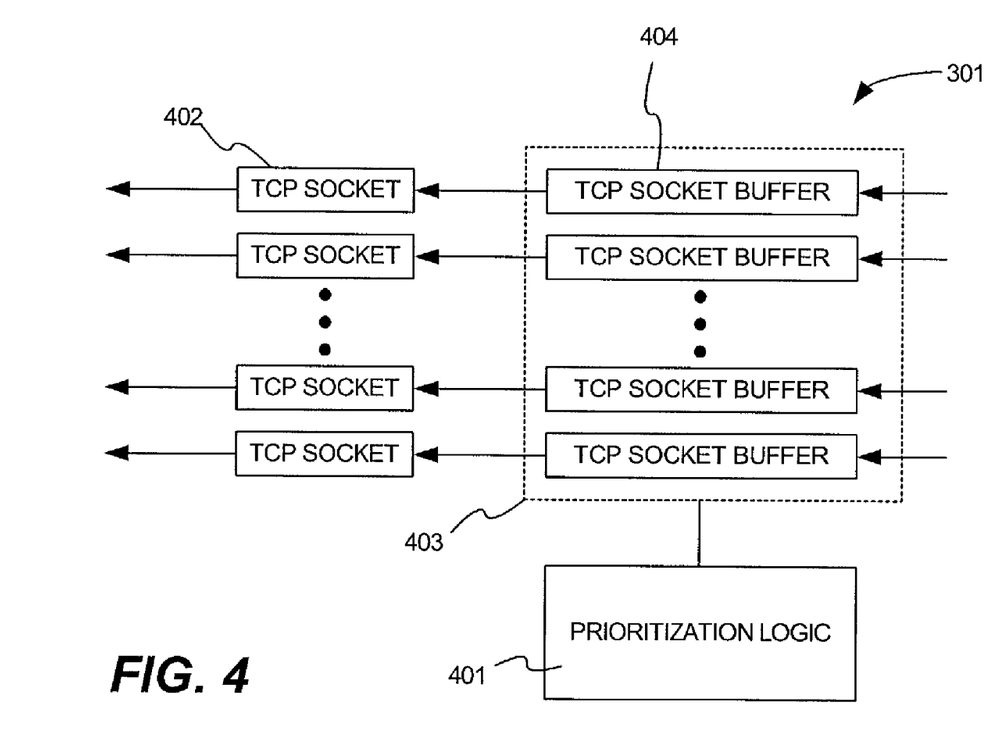
FIG. 4 shows the data blender prioritization mechanism of FIG. 3 in greater detail.

FIG. 4 illustrates the TCP component 301 in greater detail. Each TCP socket 402 maintained between the front-end 201 and a client 205 corresponds to a location 404 within reorder buffer 403. A TCP socket is created upon receipt of a request packet from a client 205. As a response packet is received into front-end 201, it is placed in its corresponding location 404 in reorder buffer 403. Reorder buffer 403 can receive response packets from either HTTP reassemble component 307 or cache 303 depending on where the response packet is served from.

When a TCP socket is created, it is assigned a priority by prioritization logic 401. For purposes of the present invention, any algorithm or criteria may be used to assign a priority, but initially it may be assigned a default or neutral priority. Alternatively, a priority may be communicated in the payload portion of a request, or by way of a cookie value accompanying the request. The TCP socket priority may be updated by prioritization logic 401 when a response is received by way of a priority value explicitly encoded in the response or a set cookie value accompanying the response. Alternatively, the priority value may be implicitly updated by analysis of the content of the response (e.g., stock quotes are given a high priority, user input forms given a low priority). Alternatively, priority information may be provided out of band.

When sending data, prioritization logic 401 selects from among the entries 404 that are ready to be transmitted. Although front-end 201 can maintain tens or hundreds of TCP sockets 401 and preferably has a high bandwidth connection, not all ready packets can use the TCP connection at one time. Prior systems would handle this by sending packets on a first-in-first-out (FIFO) basis and by using the fairness algorithms built into the TCP protocol. In contrast, the present invention explicitly selects certain TCP sockets on which to send data according to an independent prioritization scheme.

In one embodiment, prioritization is accomplished by selecting which entries 404 are sent from reorder buffer 403 to the corresponding TCP socket 402. From this point, TCP socket 402 implements standard TCP functionality to transport the packet. This functionality includes a credit-based flow control mechanism that provides a fairness algorithm that associates a window of a particular size with each TCP socket. A TCP socket can only send packets when there is room in its window, and must buffer all packets until room in its window becomes available. Each time a packet is sent, the available space in the window decreases and each time an acknowledge packet is received the available space in the window is increased. The window size changes by expanding gradually up to a predefined maximum size when bandwidth is available, and contracting rapidly where there is congestion as indicated by lost and/or damaged packets.

In accordance with an alternative embodiment of the present invention, the window size and rate of change of window size are regulated by prioritization logic 401 rather than purely by TCP standards. For example, in an instance where TCP component 301 is maintaining ten TCP sockets 402, and each socket 402 is "entitled" to a maximum window size of ten under current bandwidth conditions, there are a total of 10×10 or 100 window credits that can be managed. Conventional TCP would allow the TCP protocol to manage these independently. However, the present invention contemplates that credits may be removed from one TCP socket and given to another such that a low priority socket may be given a maximum window size of 5 and a higher priority socket a maximum window size of 15. Moreover, the rate at which the window size increases/decreases under various conditions can be managed on a socket-by-socket basis such that in aggregate TCP unit 301 behaves as expected, but individually the TCP sockets 402 are micromanaged to provide prioritization of some sockets over others.

Controlling the rate and/or order that data is communicated with the last-mile communication system, as described above, is one method of controlling the prioritization and quality of service within the last-mile communication network that does not require any explicit control over all data between the Internet and the last-mile system itself. However, it is contemplated that in many instances the last-mile communication system provider will benefit from such external prioritization control and allow explicit management. Referring to FIG. 2, router 235 serves as the access point for a wireless interface component 215. Router 235 provides a control interface that enables external prioritization control provided by a front-end 201 to manipulate the rate and order at which router 235 handles packets. When such control is enabled, buffer resources within router 235 can be used to select which packets are buffered and which are sent to clients 205 according to the prioritization logic 401 shown in FIG. 4. It is not required, but useful if front-end 201 receives all data traffic as well. Alternatively, as shown in FIG. 2, the last-mile network can communicate in a conventional manner with the Internet at large.

As yet another alternative, a front-end 201 may be coupled between a router 235 and a wireless front-end 215 (or other shared bandwidth interface such as a cable front-end 225). This requires specific cooperation of the last-mile communication provider, but enables a prioritization in a manner as described above.

While the present invention is primarily described in conjunction with client-server systems, the teachings are readily extended to peer-to-peer and server-to-server connections as well. With the increased availability of shared bandwidth connection channels it is increasingly feasible to couple both client, server, and peer processes through a shared bandwidth connection. Accordingly reference to "clients" and "servers" throughout the instant specification and claims are intended to be viewed broadly to include both peer-to-peer and server-to-server implementations.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, while devices supporting HTTP data traffic are used in the examples, the HTTP devices may be replaced or augmented to support other public and proprietary protocols and languages including FTP, NNTP, SMTP, SQL and the like. In such implementations the front-end 201 and/or back end 203 are modified to implement the desired protocol. Moreover, front-end 201 and back-end 203 may support different protocols and languages such that the front-end 201 supports, for example, HTTP traffic with a client and the back-end supports a DBMS protocol such as SQL. Such implementations not only provide the advantages of the present invention, but also enable a client to access a rich set of network resources with minimal client software.

I claim:

1. A system for prioritizing communication in a shared bandwidth communication network comprising:

an interface to the shared bandwidth communication network operable to transport data for a plurality of users; and a front-end server coupled to the interface to select the rate and order at which data is supplied through the interface to the shared bandwidth communication network; and wherein the front-end server selectively supplies the data to TCP channels supported by the interface at a rate and order that effectively prioritizes some channels over other channels.

2. The system of claim 1 wherein the interface is a router and the front-end server couples to the router, wherein the front-end server communicates control information to the router to manipulate the rate and order of data flow through the router.

3. The system of claim 1 wherein the front-end server manipulates TCP parameters including window size, window expansion rate, and window contraction rate to effectively prioritize some channels over other channels.

4. The system of claim 1 wherein the shared bandwidth communication system comprises a gateway to a wireless network.

5. The system of claim 1 wherein the shared bandwidth communication system comprises a cable modem system.

6. The system of claim 1 wherein the shared bandwidth communication system comprises a network having a shared access point, wherein the access point creates a bandwidth restriction that is shared by all users of the access point.

7. The system of claim 1 wherein the shared bandwidth communication system comprises an Internet Service Provider.

8. A method for prioritizing communication in a shared bandwidth communication system comprising:
   receiving a plurality of data transmissions from a second communication system, each of the plurality of data transmissions corresponding to a particular client;
   queuing the plurality of data transmissions in a plurality of created sockets
   communicating the plurality of data transmissions in a prioritized fashion to the shared bandwidth communication system; and
   wherein the act of creating a socket comprises creating a TCP socket for each client request; and
   wherein the act of communicating in a prioritized fashion comprises selectively applying data to the TCP socket at a rate and order that effectively prioritizes some sockets over other sockets.

9. The method of claim 8 each created socket corresponds to a separate one of the plurality of data transmissions.

10. The method of claim 9 wherein each socket is associated with a priority value.

11. The method of claim 8 wherein the step of communicating in a prioritized fashion comprises regulating the rate at which responses are communicated on a socket-by-socket basis.

12. The method of claim 8 wherein the step of communicating in a prioritized fashion comprises reordering responses.

13. The method of claim 8 further comprising associating a priority value with each socket.

14. The method of claim 13 further comprising identifying information in each response that indicates a current priority value and using the current priority value as the priority value that is assigned to each socket.

15. The method of claim 8 wherein the act of communicating in a prioritized fashion comprises manipulating TCP parameters including window size, window expansion rate, and window contraction rate to effectively prioritize some sockets over other sockets.

16. The method of claim 8 wherein the shared bandwidth communication system comprises a wireless network.

17. The method of claim 8 wherein the shared bandwidth communication system comprises a gateway to a wireless network.

18. The method of claim 8 wherein the shared bandwidth communication system comprises a cable modem system.

19. A front-end server for controlling prioritization in an external shared bandwidth communication network comprising:
   a first interface to the shared bandwidth communication network;
   a second interface to a data network;
   data buffers operable to hold data for each of a plurality of clients;
   means to selectively apply data from the buffers to the interface so as to communicate the data to the shared bandwidth communication network in a manner that prioritizes some data in the buffer over other data in the buffer; and
   wherein the means to selectively apply modifies the rate/order at which data is applied from the data buffers to the interface by throttling bandwidth allocated to a first set of the data so as to explicitly gain more than a fair share of available bandwidth for a second set of the data.

20. The server of claim 19 wherein the means to selectively apply modifies the order in which data is applied from the data buffers to the first interface.

21. The server of claim 19 wherein the second interface includes mechanisms for communicating prioritization information associated with data communicated with the data network.

22. A front-end server for controlling prioritization in an shared bandwidth communication network having an available bandwidth for a first and a second set of data transmissions, the server comprising:
   one or more interfaces to the shared bandwidth communication network; and
   means to gain more than a fair share of the available bandwidth for the first set of data transmissions out of the available bandwidth for the first and the second sets of data transmissions; and
   wherein the means to gain more than a fair share includes mechanisms operative to throttle bandwidth allocated to the second set of data transmissions so as to effectively prioritizes the first set of data transmissions.

* * * * *